US012693631B2

(12) United States Patent
Ummel

(10) Patent No.: US 12,693,631 B2
(45) Date of Patent: Jul. 28, 2026

(54) ISOTHERMAL DEVICE FOR WATCH

(71) Applicant: Omega SA, Biel (CH)

(72) Inventor: Antoine Ummel, Neuchâtel (CH)

(73) Assignee: OMEGA SA, Biel/Bienne (CH)

( * ) Notice: Subject to any disclaimer, the term of this patent is extended or adjusted under 35 U.S.C. 154(b) by 342 days.

(21) Appl. No.: 18/532,657

(22) Filed: Dec. 7, 2023

(65) Prior Publication Data

US 2024/0210887 A1 Jun. 27, 2024

(30) Foreign Application Priority Data

Dec. 23, 2022 (EP) .................................... 22216514

(51) Int. Cl.
*G04B 43/00* (2006.01)
*G04B 37/00* (2006.01)
*G04B 37/02* (2006.01)
*G04B 39/00* (2006.01)

(52) U.S. Cl.
CPC ......... *G04B 43/005* (2013.01); *G04B 37/005* (2013.01); *G04B 37/02* (2013.01); *G04B 39/00* (2013.01)

(58) Field of Classification Search
None
See application file for complete search history.

(56) References Cited

U.S. PATENT DOCUMENTS

| | | | | |
|---|---|---|---|---|
| 3,740,944 A * | 6/1973 | Chopard | G04B 43/005 368/286 |
| 2017/0371222 A1* | 12/2017 | Driscoll | B60R 16/023 |
| 2022/0179368 A1* | 6/2022 | Franzi | G04B 37/04 |
| 2022/0180614 A1 | 6/2022 | Staton et al. | |

FOREIGN PATENT DOCUMENTS

| | | | | |
|---|---|---|---|---|
| CH | 716914 A2 * | 6/2021 | G04B 43/005 |
| CN | 105607466 A | 5/2016 | |
| EP | 3 163 360 A2 | 5/2017 | |
| EP | 3 163 360 A3 | 5/2017 | |
| EP | 4 012 512 A1 | 6/2022 | |
| JP | 52-40766 U | 3/1977 | |
| JP | 4-316085 A | 11/1992 | |
| JP | 2022-91696 A | 6/2022 | |
| WO | WO-9808137 A1 * | 2/1998 | E06B 9/24 |

OTHER PUBLICATIONS

European Search Report for EP 22216514 dated Jun. 7, 2023.

* cited by examiner

*Primary Examiner* — Renee S Luebke
*Assistant Examiner* — Michael James Walker
(74) *Attorney, Agent, or Firm* — Sughrue Mion, PLLC

(57) ABSTRACT

An isothermal device (1) for mechanical and/or functional components (5) of a watch (10), including a case (2) provided with an enclosure (4) wherein a case (12) of the watch (10) can be removably arranged, a crystal (11) arranged facing a crystal (6) of the case (2), the device (1) comprising: a reversible fastening device (13) fastening the watch (10) case (12) in the enclosure (4) by keeping it away from functional elements (15) of the case (2), the elements (15) forming the enclosure (4) comprising a middle (9*a*), a back (9*b*) and the variable-opacity crystal (6) of the case (2), and a system (3) for dynamically controlling the temperature of the enclosure (4) comprising the variable-opacity crystal (6) and a control unit (8) configured to control the opacity of the crystal (6) of the case (2).

12 Claims, 1 Drawing Sheet

ISOTHERMAL DEVICE FOR WATCH

CROSS REFERENCE TO RELATED APPLICATION

This application claims priority to European Patent Application No. 22216514.4 filed Dec. 23, 2022, the entire contents of which are incorporated herein by reference.

TECHNICAL FIELD OF THE INVENTION

The invention relates to an isothermal device for mechanical and/or functional components of a watch arranged in a case of this device, said device comprising a system for dynamically controlling the temperature of the enclosure of this case.

TECHNOLOGICAL BACKGROUND

A watch typically comprises a bracelet and a watch case including several mechanical or electronic components. It is known in the prior art that some of these components cannot withstand certain temperatures, and stop functioning properly at these temperatures.

There is therefore a need to be able to use a watch, particularly an electronic watch, in environments where such temperatures may prevail.

SUMMARY OF THE INVENTION

To this end, the invention relates to an isothermal device for mechanical and/or functional components of a watch, comprising a case provided with an enclosure wherein a case of said watch may be removably arranged, a crystal of which is arranged facing a crystal of said case, said device comprising:

- a reversible fastening device fastening said watch case in said enclosure by keeping it away from functional elements of this case, said elements forming this enclosure comprising a middle, a back and the variable-opacity crystal of this case, and
- a system for dynamically controlling the temperature of this enclosure comprising said variable-opacity glass and a control unit configured to control the opacity of said enclosure crystal of the case.

In other embodiments:

- said variable-opacity crystal comprises an element for varying the transmittance of said crystal;
- the control unit (8) is connected using a connecting element to the element for varying the transmittance of the variable-opacity crystal;
- the variable-opacity crystal comprises a transparent substrate, a lower surface of which comprises a transmittance variation element;
- the variable-opacity crystal comprises a transparent substrate including a transmittance variation element included in its body;
- the transparent substrate is formed by two layers of transparent material, between which layers the transmittance variation element formed by the stack of functional layers is disposed;
- the control unit comprises at least one event sensor, said event being capable of causing a temperature variation in the enclosure of the case, such a sensor being a luminosity sensor and/or a temperature sensor;

- the element for varying the transmittance of the variable-opacity crystal is an electrochromic element, in particular a liquid-crystal electrochromic element;
- said enclosure is in a vacuum or quasi-vacuum;
- the variable-opacity crystal has a surface area that is substantially greater or strictly greater than that of the watch case crystal.

BRIEF DESCRIPTION OF THE FIGURES

Other features and advantages will be clear from the description which follows, by way of indication and by no means limitation, with reference to the appended figures, wherein.

DETAILED DESCRIPTION OF THE INVENTION

Figure 1:
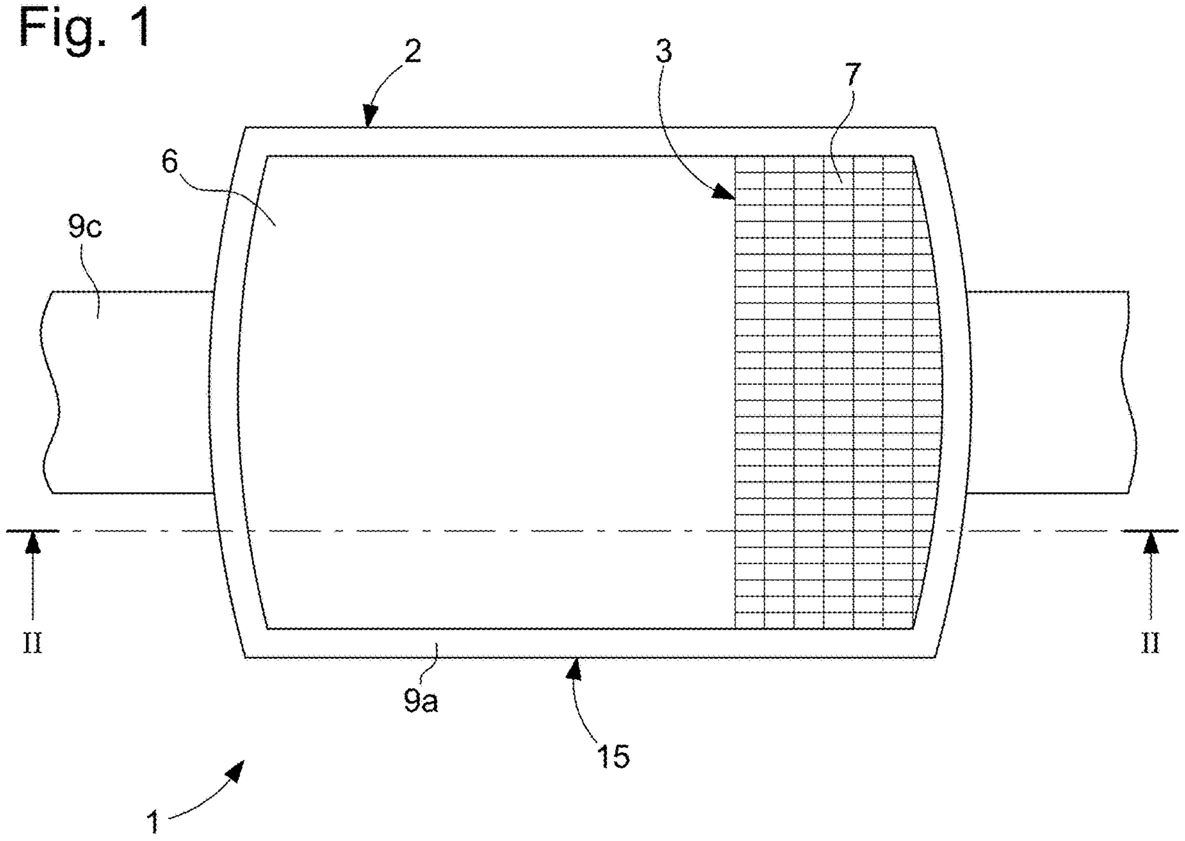
FIG. 1 is a schematic representation of a top view of an isothermal device comprising a case provided with a crystal comprising an element for varying a transmittance of said crystal, according to embodiments of the invention.
Figure 2:
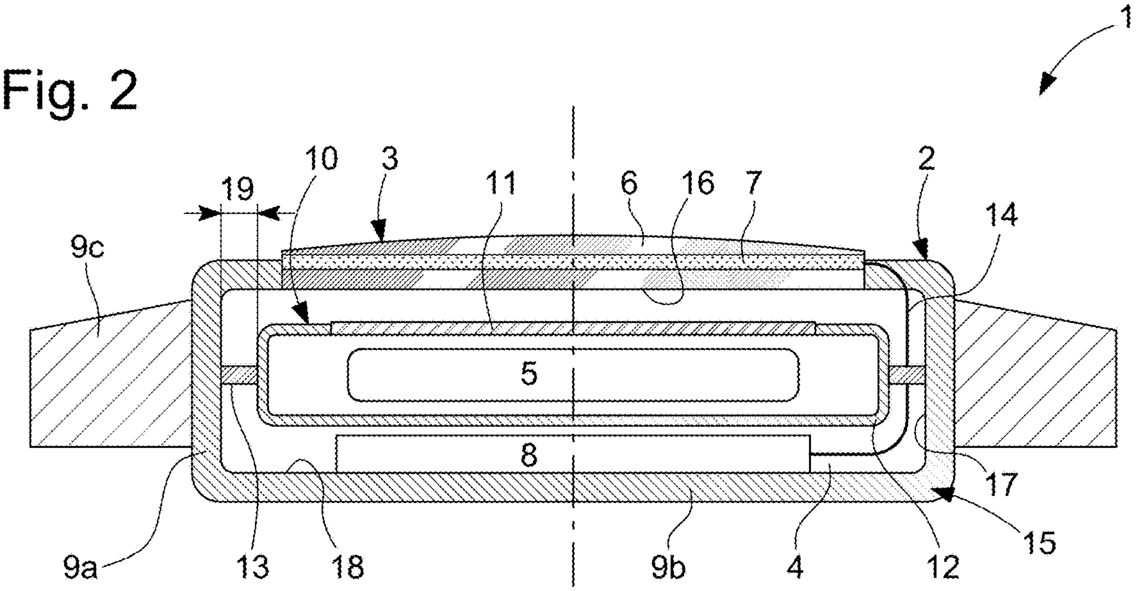
FIG. 2 is a sectional view along axis II-II of the schematic representation of the watch in FIG. 1, according to the embodiments of the invention.

FIGS. 1 and 2 show an isothermal horological device 1 for mechanical and/or functional components 5 of a watch 10. This isothermal device 1, also known as a “Dewar horological device” or, more simply, a “Dewar device”, comprises a thermal protection case 2. Such a case 2 is also known as an “isothermal case” or “Dewar case”. This isothermal protection device 1 for mechanical and/or functional components 5 of a watch 10, is able to provide good thermal insulation for mechanical and/or functional components 5 of the watch 10, a case 12 of which must be arranged in an enclosure 4 of this case 2 in order to provide such thermal insulation for these components 5. In other words, this case 2 is formed in particular by the combination of its functional elements 15 with the case 12 of the watch 10 in order to create suitable thermal insulation for these mechanical and/or functional components 5. These functional elements 15 of the case 2 forming this said enclosure 4 comprise a crystal 6, an inner peripheral wall 17 of a middle **9*a* and a back 9*b* of this case 2. In this configuration, the watch 10 case 12 is arranged in such an enclosure 4 while being kept away from or at a distance from the functional elements of the case 2 forming said enclosure 4. It should be noted that this inner peripheral wall 17 of the middle 9*a* is also that of said enclosure 4**.

In this isothermal device 1, the case 2 comprises a system 3 for dynamically controlling the temperature of its enclosure 4. Such a system 3 helps regulate the temperature prevailing in this enclosure 4. To do this, this system 3 comprises the crystal 6 of the case 2, which is a transparent variable-opacity crystal 6, also known simply as variable-opacity crystal 6, and a control unit 8 connected to this crystal 6 which is configured to control this opacity.

In this context, the control unit 8 includes an electronic circuit comprising a controller provided with hardware resources, in particular at least one processor cooperating with memory elements as well as data and control address buses, and also an energy accumulator otherwise known as a battery. This control unit 8 comprises in its memory elements an algorithm for managing the temperature in the enclosure 4 of the case 2. Such an algorithm is executed by the processor of this control unit 8, taking account in particular of data from event sensors included in the control unit 8 in order to manage the temperature in the enclosure 4 of the case 2. It should be noted that such data may, for example, provide information relating to events detected by these sensors, said events being likely to contribute to/induce/generate a variation in the temperature in the enclosure 4 of the case 2. These events may comprise, but are not limited to: the detection of a particular level of luminosity in the environment of the isothermal device 1, in particular solar radiation, and the detection of a temperature variation in the enclosure 4 relative to a configurable reference temperature, etc.

In this context, the event sensor comprises in particular and in a non-limitative and non-exhaustive manner:

- a luminosity sensor comprising a solar radiation sensor and/or an infrared solar radiation sensor and/or an ultraviolet solar radiation sensor, and/or
- a temperature sensor.

It should be noted that each event sensor forms part of the control unit 8 and is connected to the controller of this unit 8. The temperature sensor is located in the enclosure 4 of the case 2. The luminosity sensor is located in the case 2 and in particular in at least one of the functional elements 15 of this case 2 so as to be exposed to the light coming from the external environment of the isothermal device 1 and therefore of the case 2. By way of example, this luminosity sensor can be arranged in the body of the crystal 6 of the case 2 and/or on an internal face 16 of this crystal 6.

In this isothermal device 1, the control unit 8 comprises a substrate such as a flexible PCB on which its electronic circuit is arranged, with the exception of the luminosity sensor which may be comprised in the crystal 6 or on an internal face 16 of this crystal 6 of the case 2. In this context, the circuit can be built on this substrate using three-dimensional printing processes or polymer printing processes. It should be noted that this substrate is arranged in the enclosure 4 on one of the functional elements 15 such as the inner face 18 of the back 9*b* or on the inner peripheral wall 17 of the enclosure 4.

As mentioned above, the control unit 8, and in particular its controller, is linked/connected via a connecting element 14 to the crystal 6 of the case 2. Such a crystal 6 is formed by a substrate and an element for varying the transmittance 7 of this substrate, and by extension of the crystal 6. Such an element for varying transmittance 7 is, for example, an electrochromic element, in particular a liquid-crystal electrochromic element. It is reminded that this transmittance is the quantity of energy (thermal or luminous radiation) that the crystal 6 of the case 2 is capable of transmitting in relation to the flux of incident solar radiation. It should be noted that such a substrate is made of a material such as glass, such as mineral glass, optical ceramics, acrylic glass or sapphire glass.

Such a transmittance variation element 7, when it is an electrochromic element, includes a layer of an electrochromic material capable of reversibly and simultaneously inserting cations and electrons and the oxidation states of which corresponding to the inserted and deinserted states are of distinct colouration, one of the states having a higher light transmission than the other. The insertion or deinsertion reaction is controlled by an application of an electrical voltage by the control unit 8. The electrochromic material, usually based on tungsten oxide, must thus be brought into contact with a source of electrons, such as a transparent electrically conductive layer, and a source of cations, such as an ionic conductive electrolyte.

In a first variant of the crystal 6 of the case 2, the transmittance variation element 7 is arranged/applied/printed/deposited on a lower surface of the substrate, then forming the inner face 16 of this crystal 6. This transmittance variation element 7 is formed in a known manner from a stack of functional layers. More specifically, in the case of a liquid-crystal electrochromic element, it comprises a film placed between first and second electrically conductive layers and based on a polymeric material wherein droplets of liquid crystals, in particular nematic liquid crystals with positive dielectric anisotropy, are dispersed. When the film is energised, the liquid crystals orient themselves along a preferred axis, and configure the crystal 6 in a first state where the transmittance of this crystal 6 is at a maximum. When the film is de-energised, in the absence of crystal alignment, the film becomes diffusive and absorbent, and the crystal 6 is then configured in a second state where its transmittance is minimal or even zero.

In a second variant of the crystal 6 of the case 2, the transmittance variation element 7 is comprised in the body of the substrate forming this crystal 6 of the case 2. In this context, this substrate can be formed by two layers of transparent material such as glass, between which layers the transmittance variation element 7 formed by a stack of functional layers is disposed. When this transmittance variation element 7 is an electrochromic element, these functional layers may comprise, for example:

- a first electrically conductive layer;
- a first layer of anodic electrochromic material made of hydrated iridium oxide (it could be replaced by a layer of hydrated nickel oxide);
- a layer of hydrated tantalum oxide with a protective function;
- a layer of electrolyte in solid solution of polyoxyethylene with phosphoric acid;
- a second layer of cathodic electrochromic material based on tungsten oxide;
- a second electrically conductive layer.

It should be noted that in these two variants, the stack of functional layers forming the transmittance variation element 7 may comprise an additional layer of thermoplastic polymer such as polyvinyl butyral known by the acronym PVB, which preferably contains ultraviolet filtering agents. Such a layer can be arranged in the first variant just after the first electrically conductive layer, and in the second variant between the glass layer and the first electrically conductive layer.

Thus, by controlling the variation of an electrical voltage applied to the first and second electrically conductive layers of the transmittance variation element 7, the control unit 8 makes it possible to vary the transmittance property of the crystal 6 of the case 2 between the first and second transmittance states. Let us recall that the first state here relates to a maximum transmittance of this crystal 6 during which state, this crystal 6 of the case 2 is then transparent, allowing solar radiation to penetrate the enclosure 4 thereof. The second state relates to a minimum or zero transmittance of the crystal 6, during which state the crystal 6 is then completely or partially opaque, preventing/blocking the penetration of at least 99% of solar radiation into this enclosure 4. In other words, in this second state, solar radiation is no longer transmitted by the crystal 6 into the enclosure 4 of the case 2.

In addition, as previously mentioned, the watch 10 case 12 is arranged in the case 2 of this isothermal device 1 while being kept away or at a distance 19 or even well away 19 from the inner peripheral wall 17 of the enclosure 4, thanks to the reversible fastening device 13 of the case 2. In other words, such a fastening device 13 is able to configure a separation 19 between said case 12 and functional elements of the case 2 forming said enclosure 4. In this configuration, the fastening device 13 helps reduce or even eliminate any heat conduction between the inner peripheral wall 17 of the middle 9*a* (or of the enclosure 4) and/or the back 9*b* and/or the crystal 6 with the watch 10 case 12, in particular with an outer overall face of this case 12. This outer overall face includes an upper face comprising the crystal 11 of the case 12 of this watch 10, a lower face comprising a back of said case 12 and an outer peripheral wall of a middle of this case 12.

In this configuration, the fastening device 13 creating a reversible fastening of the watch 10 case 12 on the inner peripheral wall 17 of the enclosure 4 of the case 2 may comprise:

- connecting organs each having first and second ends capable of connecting respectively to the watch 10 case 12 and to the inner peripheral wall 17 of the enclosure 4 of this case 2. The body of each organ has a particular structure which helps ensure a reduction in heat loss to the external environment of the case 2 of the isothermal device 1 and therefore ensure a stable internal temperature in the watch 10 case 12, and/or
- connecting organs configured to ensure magnetic suspension of said watch 10 case 12 in said enclosure 4. In fact, these connecting organs are configured to ensure and maintain a separation 19 between said case 12 and the functional elements 15 forming said enclosure 4 of the case 2. Such connecting organs help reduce or even eliminate any heat conduction between the inner peripheral wall 17 of the middle 9*a* and/or the back 9*b* and/or the crystal 11 with the watch 10 case 12, in particular with an outer overall face of this case 12.

It should be noted that the case 12 is included in a watch 10, which may be an electronic watch, such as a quartz watch, or a mechanical watch or an electromechanical watch.

The above-mentioned mechanical and/or functional components 5 of the watch 10 comprise in a non-restrictive and non-exhaustive manner: a horological movement, display device such as a dial, hands, rings, joints and/or electronic and/or electrical components. It should be noted in particular that such electronic and/or electrical components include, for example, a display device, a processor, a memory, an energy storage component, a motor, an integrated circuit and an electronic oscillator, etc.

In this context, this device 1 therefore comprises the case 2 which includes the middle 9*a* on which is mounted a bracelet 9*c* enabling a user of this device 1 to wear it. This case 2 also includes the aforementioned crystal 6 and back 9*b*. In this device 1, it should be noted that the crystal 6 preferably comprises a surface area that is substantially greater than or strictly greater than a crystal 11 of the watch 10 case 12. In other words, the inner face 16 of the crystal 6 has a surface area that is substantially greater than or strictly greater than or equal to that of an upper face of the crystal 11 of the watch 10.

As we have seen, the functional elements 15 such as the crystal 6, the middle 9*a* and the back 9*b* of this device 1 together define the enclosure 4 of this case 2 which is able to receive the watch 10 case 12. These three elements 15 of the case 2, namely the middle 9*a*, the crystal 6 and the back 9*b*, may be separate elements which are joined together to construct this enclosure 4. Alternatively, the middle 9*a* and the back 9*b* of the case 2 may together form a one-piece part, said one-piece part defining an opening opposite the back 9*b* which is capable of being closed by the crystal 6 in a reversible and hermetically sealed manner. Alternatively, the middle 9*a* and the crystal 6 of the watch 10 case 2 can together form a one-piece part, said one-piece part defining an opening opposite the crystal 6 which can be closed by the back 9*b*, also reversibly and in a watertight and hermetic manner.

The middle 9*a* and back 9*b* are preferably made, in a non-restrictive and non-exhaustive manner, of a metallic material, glass or thermosetting or thermoplastic polymer resins reinforced with carbon or glass fibres, or of ceramic materials. It should be noted that when the middle 9*a* and the back 9*b* are transparent or semi-transparent, being made of glass for example, the inner peripheral wall 17 of the middle 9*a* and the inner face 18 of the back 9*b* may be coated with a metallic or similar reflective coating, such as a layer of silver for example.

In addition, in this device, when the watch 10 case 12 is arranged in the enclosure 4 of the case 2, the space defined between this case 12 and the inner peripheral wall 17 of the middle 9*a*, the back 9*b* and the crystal 6 is empty of material or virtually empty. In other words, the enclosure 4 is in a vacuum or quasi-vacuum.

It is therefore understood that in this configuration, this isothermal device 1 has the same properties and features as a Dewar tube/vessel well known in the prior art. As previously mentioned, the properties and features of this isothermal device 1 help give it good thermal insulation with regard to the extreme temperatures in particular that may prevail in the external environment wherein such a device 1 may be located.

In addition, it should be noted that the mechanical and/or functional components 5 of the watch 10 may be non-magnetic and/or that the case 2 of the watch 10 may be made of a material or be covered with a coating enabling these components to be insulated from magnetic fields.

Furthermore, the fastening device 13 helps dispose the watch 10 case 12 in this case 2 so that the crystal 11 of this watch 10 case 12 is arranged facing the crystal 6 of the case 2 so that the information on the dial and/or the display interface of this watch 10 can be perceived through the transparent crystal 6 of the case 2 by the user wearing the isothermal device 1.

Thus, such an isothermal device 1 provides the mechanical and/or functional components 5 of the watch 10 with very good thermal insulation from the external environment by reducing or even preventing heat loss by radiation from the components arranged in the watch 10 case 12 over a long period. Thus, when the temperature outside the device 1 reaches extreme values, the temperature inside the enclosure 4 remains substantially equal to the temperature present in the watch 10 case 12 when it was arranged in the case 2, typically around 20° C. It should be noted that whatever the temperature conditions prevailing in the environment of the isothermal device 1, the temperature present in the watch 10 case 12 is a temperature which does not hinder the proper functioning of the watch 10. This temperature is maintained for a duration which is 2 to 18 times longer than the duration during which such a watch 10 case 12 would be capable of maintaining an operating temperature of its components if it were located directly in such an environment where such temperatures prevail, i.e. if it were located outside the case 2 of the isothermal device 1. It is thus conceivable that such a configuration makes it possible to protect the mechanical and/or functional components 5 of the watch 10, and help ensure that they operate optimally in extreme external temperature conditions.

It goes without saying that the present invention is not limited to the embodiments described above and that various simple modifications and variants may be envisaged by the person skilled in the art without departing from the scope of the invention as defined by the appended claims. For example, it may be envisaged that the control unit 8 may comprise a motion sensor for the isothermal device 1 making it possible, in particular, to activate the passage of the crystal 6 of the case 2 from the second state to the first transmittance state as soon as it is detected that the user of the isothermal device wishes to take note of information displayed on the dial of the watch 10 by orienting the crystal 6 of the case 2 in the direction of their gaze. Such a sensor may be a gyroscopic and/or inertial sensor in the form of an electronic component of the gyroscopic and/or inertial electromechanical microsystem circuit type.

The invention claimed is:

1. An isothermal device for any of mechanical and functional components of a watch, the isothermal device comprising:

an outer case comprising an enclosure therein and wherein a watch case of said watch can be removably arranged, a watch crystal of which is arranged facing a variable-opacity outer case crystal of the outer case;

a reversible fastening device fastening said watch case in said enclosure and holding the watch case away from functional elements of the outer case, said functional elements forming the enclosure and comprise a middle, a back, and the variable-opacity outer case crystal of the outer case; and a system configured to dynamically control a temperature of the enclosure and comprising said variable-opacity outer case crystal and, within the enclosure and separate from the watch case, a control unit configured to control an opacity of said variable-opacity outer case crystal of the outer case.

2. The isothermal device according to claim 1, wherein said variable-opacity outer case crystal comprises an element configured to vary a transmittance of the variable-opacity outer case crystal.

3. The isothermal device according to claim 2, wherein the control unit is connected, by a connecting element, to the element configured to vary the transmittance of the variable-opacity outer case crystal.

4. The isothermal device according to claim 1, wherein the variable-opacity outer case crystal comprises a transparent substrate and a lower surface which comprises an element configured to vary a transmittance of the variable-opacity outer case crystal.

5. The isothermal device according to claim 1, wherein the variable-opacity outer case crystal comprises a transparent substrate including a transmittance variation element comprised in a body of the variable-opacity outer case crystal.

6. The isothermal device according to claim 1, wherein the variable-opacity outer case crystal comprises a transparent substrate including a transmittance variation element comprised in a body of the variable-opacity outer case crystal, the transparent substrate comprising two layers of transparent material between which, as a stack of functional layers, the transmittance variation element is disposed.

7. The isothermal device according to claim 1, wherein the control unit comprises at least one event sensor configured to sense a temperature variation in the enclosure of the outer case, wherein the at least one event sensor is at least one of a luminosity sensor and a temperature sensor.

8. The isothermal device according to claim 1, wherein said variable-opacity outer case crystal comprises a liquid-crystal electrochromic element configured to vary a transmittance of the variable-opacity outer case crystal.

9. The isothermal device according to claim 1, wherein the watch case is held in any of a vacuum in the enclosure and a quasi-vacuum in the enclosure.

10. The isothermal device according to claim 1, wherein the variable-opacity outer case crystal comprises a surface area which is greater than that of the watch crystal of the watch case.

11. An isothermal device for any of mechanical and functional components of a watch, the isothermal device comprising:

an outer case comprising an enclosure therein and wherein a watch case of said watch can be removably arranged, a watch crystal of which is arranged facing a variable-opacity outer case crystal of the outer case; a reversible fastening device fastening said watch case in said enclosure and holding the watch case away from functional elements of the outer case, said functional elements forming the enclosure and comprise a middle, a back, and the variable-opacity outer case crystal of the outer case; and a system configured to dynamically control a temperature of the enclosure and comprising said variable-opacity outer case crystal and a control unit configured to control an opacity of said variable-opacity outer case crystal of the outer case, wherein the variable-opacity outer case crystal comprises a transparent substrate and a lower surface which comprises an element configured to vary a transmittance of the variable-opacity outer case crystal.

12. An isothermal device for any of mechanical and functional components of a watch, the isothermal device comprising:

an outer case comprising an enclosure therein and wherein a watch case of said watch can be removably arranged, a watch crystal of which is arranged facing a variable-opacity outer case crystal of the outer case; a reversible fastening device fastening said watch case in said enclosure and holding the watch case away from functional elements of the outer case, said functional elements forming the enclosure and comprise a middle, a back, and the variable-opacity outer case crystal of the outer case; and a system configured to dynamically control a temperature of the enclosure and comprising said variable-opacity outer case crystal and a control unit configured to control an opacity of said variable-opacity outer case crystal of the outer case, wherein the variable-opacity outer case crystal comprises a transparent substrate including a transmittance variation element comprised in a body of the variable-opacity outer case crystal.

* * * * *